(12) United States Patent
Hamilton et al.

(10) Patent No.: US 10,713,603 B2
(45) Date of Patent: *Jul. 14, 2020

(54) SYSTEM AND METHOD OF WORK ASSIGNMENT MANAGEMENT

(71) Applicant: Verint Americas Inc., Alpharetta, GA (US)

(72) Inventors: Edward Hamilton, Mount Hamilton, CA (US); Kaushik Deka, New York, NY (US); Geoffery Chappell, Belfast, ME (US); Michael R. Bourke, San Francisco, CA (US); Jason Fama, Redwood City, CA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,053

(22) Filed: Oct. 14, 2019

(65) Prior Publication Data

US 2020/0042912 A1 Feb. 6, 2020

Related U.S. Application Data

(63) Continuation of application No. 14/465,486, filed on Aug. 21, 2014, now Pat. No. 10,445,667.

(60) Provisional application No. 61/869,240, filed on Aug. 23, 2013.

(51) Int. Cl.
*G06Q 10/00* (2012.01)
*G06Q 10/06* (2012.01)

(52) U.S. Cl.
CPC ... *G06Q 10/063* (2013.01); *G06Q 10/063114* (2013.01); *G06Q 10/063112* (2013.01)

(58) Field of Classification Search
CPC .............. G06Q 10/06; G06Q 10/063; G06Q 10/063112; G06Q 10/063114; G06Q 10/06311; G06Q 10/063118; G06Q 10/06313; G06Q 10/1093
See application file for complete search history.

(56) References Cited

U.S. PATENT DOCUMENTS

| | | |
|---|---|---|
| 5,099,431 A | 3/1992 | Natarajan |
| 2003/0018762 A1 | 1/2003 | Mullen |
| 2003/0225604 A1 | 12/2003 | Casati |
| 2004/0064354 A1 | 4/2004 | Dietrich |
| 2006/0184943 A1 | 8/2006 | DelMonego |
| 2007/0070379 A1 | 3/2007 | Rai |

(Continued)

OTHER PUBLICATIONS

Chang, Carl K., et al. "Time-Line Based Model for Software Project scheduling with Genetic Algorithms" Information and Software Technology, vol. 50, No. 11, 2008, pp. 1142-1154. (Year 2008).

*Primary Examiner* — William S Brockington, III
(74) *Attorney, Agent, or Firm* — Christopher M. Scherer; DeWitt LLP

(57) ABSTRACT

Methods of intelligent routing of work assignment includes indexing plurality of pending tasks and indexing a plurality of available employees. A first employee is retrieved from an index of available employees. A next available task assignable to the first employee is determined. A work item from the next available task is assigned to the first employee from the available employee list. The assigned work item is removed from pending task list. The first employee is removed from the available employee list. The next employee is retrieved from the index of available employees.

20 Claims, 10 Drawing Sheets

(56) References Cited

U.S. PATENT DOCUMENTS

2009/0276281 A1 11/2009 Foltz
2009/0299810 A1 12/2009 Jardine
2012/0087486 A1 4/2012 Guerrero
2013/0325763 A1 12/2013 Cantor
2014/0136255 A1 5/2014 Grabovski

| | 5:30 | 5:45 | 6:00 | 6:15 | 6:30 | 6:45 | 7:00 | 7:15 | 7:30 | 7:45 | 8:00 | 8:15 | 8:30 | 8:45 | 9:00 | 9:15 | 9:30 | 9:45 |
|---|---|---|---|---|---|---|---|---|---|---|---|---|---|---|---|---|---|---|
| Employee 1 | A/C/E ||||||| B/D ||||| A/F/E |||||
| Employee 2 | C ||| D/E |||| B/D |||||| F |||||
| Employee 3 | A/E/F ||||||||| F/G |||||||||
| Employee 4 | A/B/C ||||||| B/D |||| A/E/F ||||| C |||

| Queue\Time | 5:30 | 5:45 | 6:00 | 6:15 | 6:30 | 6:45 | 7:00 | 7:15 | 7:30 | 7:45 | 8:00 | 8:15 | 8:30 | 8:45 | 9:00 | 9:15 | 9:30 | 9:45 |
|---|---|---|---|---|---|---|---|---|---|---|---|---|---|---|---|---|---|---|
| A | 0:00 | 0:00 | 0:05 | 0:05 | 0:10 | 0:15 | 0:15 | 0:20 | 0:15 | 0:15 | 0:15 | 0:10 | 0:10 | 0:10 | 0:00 | 0:00 | 0:00 | 0:00 |
| B | 0:10 | 0:10 | 0:10 | 0:10 | 0:10 | 0:10 | 0:10 | 0:20 | 0:20 | 0:20 | 0:20 | 0:20 | 0:15 | 0:10 | 0:05 | 0:05 | 0:05 | 0:00 |
| C | 0:10 | 0:10 | 0:10 | 0:10 | 0:20 | 0:20 | 0:20 | 0:10 | 0:20 | 0:20 | 0:20 | 0:20 | 0:15 | 0:20 | 0:05 | 0:05 | 0:05 | 0:00 |
| D | 0:20 | 0:20 | 0:10 | 0:10 | 0:10 | 0:10 | 0:10 | 0:10 | 0:05 | 0:05 | 0:05 | 0:05 | 0:25 | 0:00 | 0:05 | 0:00 | 0:00 | 0:00 |
| E | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 |
| F | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 |
| G | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 | 0:00 |

Fig. 11

| Queue\Time | 5:00 | 6:00 | 7:00 | 8:00 | 9:00 |
|---|---|---|---|---|---|
| A | 60%/20% | 70%/25% | 65%/15% | 50%/10% | 40%/5% |
| B | 50%/0% | 60%/25% | 65%/10% | 55%/10% | 40%/5% |
| C | 40%/0% | 50%/15% | 60%/30% | 45%/15% | 35%/15% |
| D | 20%/0% | 25%/0% | 60%/30% | 75%/25% | 60%/10% |
| E | 20%/0% | 20%/0% | 40%/25% | 80%/30% | 50%/20% |
| F | 15%/0% | 15%/0% | 40%/25% | 80%/35% | 55%/25% |
| G | 10%/0% | 10%/0% | 40%/25% | 85%/40% | 80%/30% |

Fig. 12

| Queue\Time | 5:30 | 5:45 | 6:00 | 6:15 | 6:30 | 6:45 | 7:00 | 7:15 | 7:30 | 7:45 | 8:00 | 8:15 | 8:30 | 8:45 | 9:00 | 9:15 | 9:30 | 9:45 |
|---|---|---|---|---|---|---|---|---|---|---|---|---|---|---|---|---|---|---|
| A | 0:45 | 0:45 | 0:45 | 0:45 | 0:45 | 0:45 | 0:45 | 0:30 | 0:15 | 0:00 | 0:00 | 0:30 | 0:30 | 0:30 | 0:15 | 0:15 | 0:15 | 0:15 |
| B | 0:15 | 0:15 | 0:15 | 0:15 | 0:15 | 0:15 | 0:15 | 0:30 | 0:45 | 0:45 | 0:45 | 0:15 | 0:15 | 0:15 | 0:00 | 0:00 | 0:00 | 0:00 |
| C | 0:45 | 0:45 | 0:45 | 0:45 | 0:45 | 0:30 | 0:30 | 0:15 | 0:00 | 0:00 | 0:00 | 0:00 | 0:00 | 0:00 | 0:15 | 0:15 | 0:15 | 0:15 |
| D | 0:00 | 0:00 | 0:00 | 0:15 | 0:15 | 0:15 | 0:15 | 0:30 | 0:45 | 0:45 | 0:45 | 0:15 | 0:15 | 0:15 | 0:00 | 0:00 | 0:00 | 0:00 |
| E | 0:15 | 0:15 | 0:15 | 0:15 | 0:15 | 0:15 | 0:30 | 0:15 | 0:15 | 0:15 | 0:15 | 0:30 | 0:30 | 0:30 | 0:15 | 0:15 | 0:15 | 0:15 |
| F | 0:15 | 0:15 | 0:15 | 0:15 | 0:15 | 0:15 | 0:15 | 0:15 | 0:15 | 0:15 | 0:15 | 0:45 | 0:45 | 0:45 | 0:45 | 0:45 | 0:45 | 0:45 |
| G | 0:00 | 0:00 | 0:00 | 0:00 | 0:00 | 0:00 | 0:00 | 0:00 | 0:00 | 0:15 | 0:15 | 0:15 | 0:15 | 0:15 | 0:15 | 0:15 | 0:15 | 0:15 |

Fig. 13

SYSTEM AND METHOD OF WORK ASSIGNMENT MANAGEMENT

CROSS-REFERENCE TO RELATED APPLICATION

The present application is a continuation of U.S. patent application Ser. No. 14/465,486, filed Aug. 21, 2014, which application claims priority of U.S. Provisional Patent Application No. 61/869,240, filed on Aug. 23, 2013, the contents of which are hereby incorporated herein by reference in their entireties.

BACKGROUND

The present disclosure is related to workforce management. More specifically, the present disclosure is related to automated assignment and routing of work between employees.

Workforce optimization software and services help organizations to improve customer service by improving responsiveness to customers as well as back office workflows designed to service customers. Such back office workflow may include customer service interactions via telephone, web chat, email, or other communication methods or platforms. Workforce optimization software and services can help to capture and analyze customer interactions, improve workforce performance, uncover business trends and competitive advantages, discovery the root cause of customer employee behaviors, improve the quality and speed of decisions, connect customer service operation more tightly to other parts of an organization, and enhance customer service. Workforce optimization software and services seek to achieve these goals, extract information from both customers and employees in customer service interactions which provide insight into the customer experience both from a customer sides of the interaction.

The management of back office work flow is often conducted on an add-hoc basis and often rely either on manual distribution of work assignments or simple work routing rules in a rudimentary automated framework. This manner of work distribution among a plurality of employees is inefficient and not optimal. Available automated work flow routing systems attempt to address this need in the back office setting, but are limited in effectiveness and success often simply applying the manual or add-hoc process into an automated form. The inventors have identified that the addition of improved foresight of employee schedules, availability, and skills combined with work flow simulations can improve automated work routing to optimize work assignment, forecast, service level and compute real life service level again forecasted service levels when processing an active backlog of work.

BRIEF DISCLOSURE

An exemplary embodiment of a method of intelligent routing of work assignments includes indexing a plurality of pending tasks in a pend task list. A plurality of available employees are indexed in an available employee list. A first employee is retrieved form the index of available employees. A next available task assignable to the first employee is determined. A work item from the next available task is assigned to the first employee from the available employee list. The assigned work item is removed from the pending task list. The first employee is removed from the available employees list. The next employee is retrieved from the index of available employees.

An exemplary embodiment of a method of comparatively determining the lateness of a work item in a work item queue includes simulating a workflow. The workflow is simulated based upon known employees schedules, know work item in a work item queue, work flow processes, and predicted new work items. An average queue wait time and an average handling time is calculated from the simulation. A predicated service time is calculated from the average queue wait time and the average handling time. A predicted lateness is calculated as the difference between a predicted service time goal and the predicted service time.

BRIEF DESCRIPTION OF THE DRAWINGS

FIG. 11 is a table that presents exemplary predicted queue wait times.

FIG. 12 is a table that presents an exemplary Allocation Plan.

FIG. 13 is a table that presents an exemplary available staffing.

DETAILED DISCLOSURE

Embodiments of the work assignment manager (WAM) as disclosed herein include a system that manages, reports, and coordinates the assignment of work items to employees. The WAM system performs these tasks through integration, routing, and scheduling portions.

In embodiments, the WAM system can increase operational efficiency and throughput by reducing bottlenecks and under-utilization of employees. In embodiments, the WAM system can help meet service goals by ensuring tasks and their dependencies are processed at necessary times. In embodiments, the WAM system may further help to predict performance against established goals.

The WAM system uses knowledge of an operation center to determine an ordering and assignment of work items that achieves management goals. Exemplary sources of such knowledge may include: schedules, skills, and proficiencies of available employees, task inter-dependencies and workflows, service goals, forecasts, and time standards of activity types/work queues.

In embodiments, the WAM system integrates with external case management systems and acts as a coordinating intermediary between employees and the external system, telling employees the order in which they should process work items and providing links into the external system to take action on assignments and perform tasks. Integration with the external system allows the WAM to keep its model of the operation's work flows and activities synchronized with the model maintained by the external system.

Figure 1:
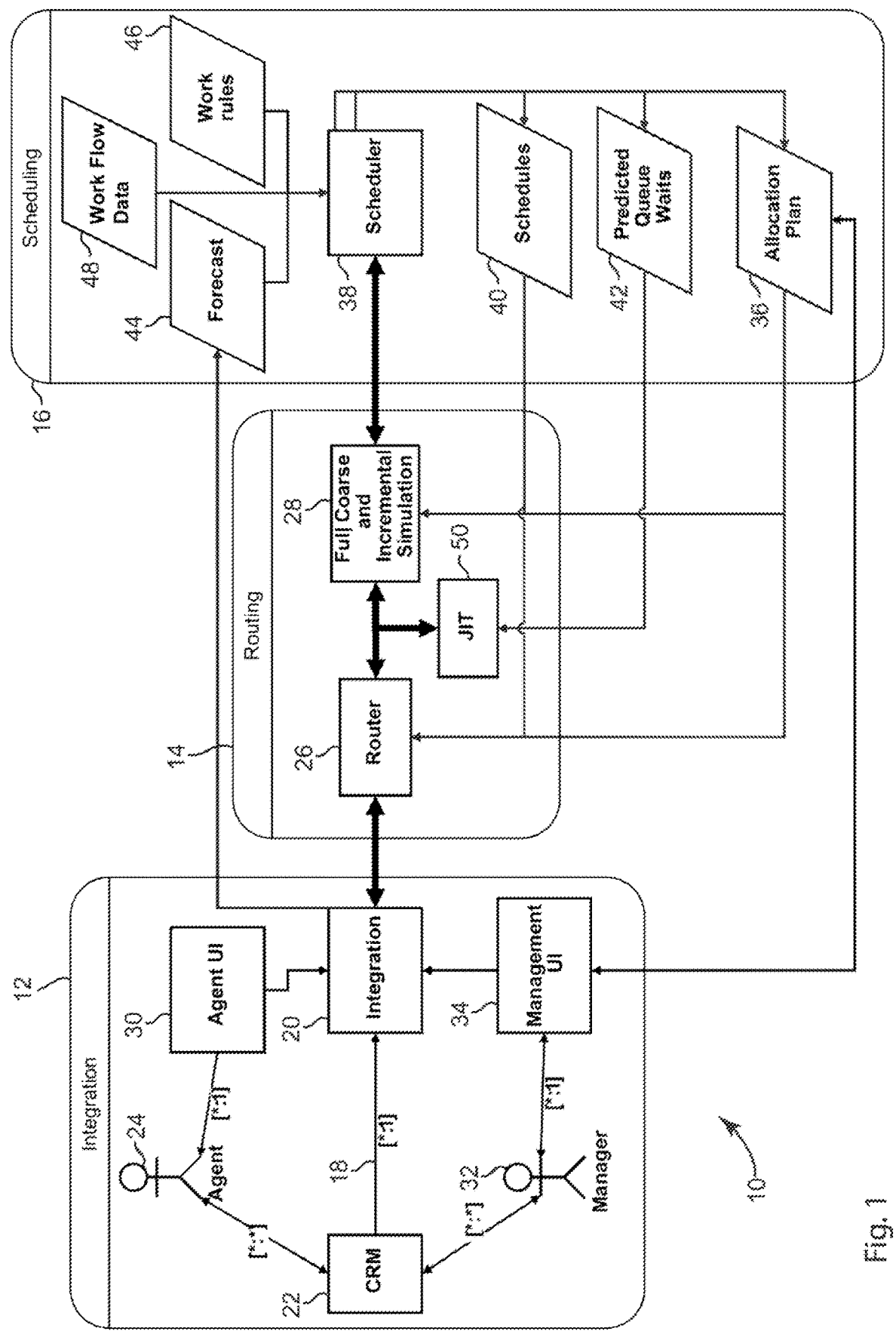
FIG. 1 is a schematic diagram of an exemplary embodiment of a work assignment manager system.

FIG. 1 depicts an exemplary embodiment of a work assignment manager (WAM) system 10. The WAM system 10 can be implemented on a computing system which may exemplarily include a computer processor or a plurality of communicatively connected computer processors. An exemplary embodiment of a computing system is described herein in further detail with respect to FIG. 2. The WAM system 10 includes three subsystems: an integration subsystem 12, a routing subsystem 14, and a scheduling subsystem 16.

The WAM system 10 periodically imports a feed 18 generated by an external case management system 22 into the integration module 20 of the integration subsystem 12. The feed 18 provides details of newly arrived work items in the external case management subsystem 22 and updates to the status of existing work items. The external system 22 is considered to be the system of record with the WAM system 10 coordinating the actions of one or more agents 24 working in the external case management system 22.

A router 26 of the routing subsystem 14 uses the system 10 to make decisions as disclosed herein to route work items imported from the external case management subsystem 22 and back out to the agents 24 working in the external case management subsystem 22. The system 10 further generates management reporting data which is routed out to the manager 32 working in the external case management subsystem 22. The router 26 generates a task list for each agent 24, the task list is directed to an agent user interface 30. The task list includes one or more hyperlinks that identify a task assigned to the agent.

The routing subsystem 14 is used to fill employee task lists with tasks to be performed in the near future (e.g. next few hours). The router 26 is also used to simulate work assignments for longer durations (e.g. days, weeks) in an effort to provide actionable information to managers about whether service goals will be met given current backlog, arrival forecasts, employee schedules, task and queue priorities, and other variables as disclosed in further detail herein and as will be recognized by a person of ordinary skill in the art based upon this disclosure.

In an exemplary embodiment of a generalized process as disclosed herein the router 26 performs incremental routing. Incremental touring relies upon previous simulations and assumptions as disclosed herein, but updates the task assignments to reflect new information and/or tasks from the external case management subsystem 22. Incremental routing may occur frequently in response to received updated information from external case management systems. In an exemplary embodiment, an incremental routing might occur every 5-15 minutes and assign tasks for 1 or 2 hours forward in time.

In an exemplary embodiment of a generalized process as disclosed herein, the simulator 28 performs one or more simulations to generate data for management reports and dashboards. This process results in allocation of all known or expected tasks based upon currently available information. This may also alternatively be known as a full routing and may occur less frequently than the incremental routings. The full routes might occur on an hourly or daily basis and will route actual and forecasted tasks for days or weeks forward in time. Since some processes may have started but not finished at the end of the routing period, estimates of process completions for those processes are generated using average queue wait times provided as input to the router. These estimated queue wait times may be supplied by the optimizing scheduler, generated by user input, or some combination of the two.

Agents 24 view their generated task lists on the agent user interface 30 and select items to work on. Clicking on a work item's hyperlink in the task list takes an agent to an appropriate application within the external case management system 22 where they can either work on the selected task or get more information about the selected task. Agents 24 can take a number of actions on their task list including marking a task complete, rejecting a task, or reactivating a task.

Managers 32 have the ability to view data on a management user interface 34. Such data includes assigned tasks, backlogs by queues over time, unassigned work items, and performance against service level goals over time. Based upon the data present on the management user interface 34, managers 32 can take manual interventions including raising the urgency of certain tasks, changing assignment of tasks, altering schedules or queue priorities, and affecting the routing by changing the allocation plan 36, as will be described in further detail herein.

The scheduling subsystem 16 generates and provides employee schedules and other employee data used by the routing subsystem 14 to allocate incoming workflow and to perform workflow simulations as described in further detail herein. The scheduler 38 of the scheduling subsystem 16 generates employee schedules 40, queue allocation plans 36, and predicted queue wait times 42. The generated outputs can be based upon work item forecasts 44 for the arrival of work items and/or work rules 46. Additionally, these outputs can be based upon other workflow data 48, including, but not limited to available employees or modeling parameters such as, but not limited to queues, workflows, skills, or service goals.

The simulator 28 of routing system 14 is used by the router 26 and the scheduler 38 to simulate when actual and forecasted work items will be worked on in some predefined time period. The simulator 28 makes use of the allocation plan 36, JIT scores calculated by the JIT module 50 as described in further detail herein, schedules 40, and other model data to determine which items should be worked on at any particular time.

The Just-In-Time (JIT) Module 50 outputs a JIT score, which is largely a measure of the elapsed time a work item spends in a queue or process compared to the desired service time for that queue or process. The JIT score is composed of a lateness term, the process for which the lateness term is measured against, a start time for that process, and the depth of the queue within the workflow. In embodiments, intelligent workflow routing is achieved, in part, by the comparative evaluation of the JIT scores of two or more work items based upon the lateness term, the process for which the lateness term is measured against the start time for the process, and/or the depth of the queue within a workflow.

In an embodiment, the JIT score may be calculated in a variety of ways depending upon the status of the work item or queue for which the JIT score is being calculated. For example, if a task is in a queue that is not part of a process, the JIT score is the lateness (the service time of the task minus the service time goal for that queue). Depending upon the configuration, this difference will be computed using actual time or open hours. In another embodiment, if a work item is in a queue that is part of a process, and the current queue is the end a of process, the JIT score is the process lateness (process service time–process service time goal), the ending process, and the start time of the ending process. In a still further embodiment, if the current queue is not the end of a process (e.g. it has one or more child queues), the JIT score is the JIT score child queue (considering workflow rules) that is most late.

In an embodiment of intelligent routing two JIT scores may compared. If the two JIT scores are for tasks in the same process which start at the same time, the JIT score with the greater depth is preferred. In an embodiment, this is so that routing favors completing a process or workflow over starting a new process item that might be slightly later. In an embodiment, the depth of a queue JIT score that is not part of a workflow maybe given a value of zero. The depth of a queue JIT score that is part of a workflow and is equal to the distance of that queue from the start of the workflow—e.g. for a workflow (A,B,C) the depth of A is 0, the depth of B is 1, and the depth of C is 2.

If the two JIT scores are not for tasks in the same process or have different process starts and one of the JIT's queue lateness is positive, then the JIT with the higher queue priority, followed by the JIT score that is more late (e.g. the score with the greater difference between actual and expected completion) is preferred. In an alternative embodiment a task may be selected if the tasks queue priority is higher than another task's queue priority. The queue priority may be set at the queue level, and may exemplarily be a volume between 0 and 10, inclusive.

Herein is provided an exemplary embodiment of an algorithm for calculating the JIT score. In the example, given below, the following terms will be used:

Predicted Queue Wait (PQW) (queue arrival) which is the predicted time that an item of work would wait if it was placed in the queue at arrival time. This value is computed by the Schedule Optimizer (or Long Term Planner) and is the Average Queue Wait (AQW) on a parallel simulation where the JIT is ignored during routing. It is to be noted that in a Monte-Carlo implemented version of JIT, PQW(q, t) could be a random variable from a distribution with expected value AQW, or a random variable from a roulette wheel of queue wait (QW) values, stored during each replication of the above simulation.

LATENESS(process or queue, serviceTime) is the lateness for a process or queue given some serviceTime. In an embodiment, lateness is computed as [serviceTime–serviceTimeGoal]. In some embodiments, early work will have a negative lateness.

JIT(queue, arrival, processStart) is the just-in-time score for a work item that arrived in queue at arrival time and is a member of a process which starts at processStart.

```
JIT(queue, arrival, processStart)
queueServiceTime = PQW(queue, arrival) + AHT(queue);
JIT.lateness = LATENESS(queue, queueServiceTime)
JIT.process = N/a
JIT.processStart = N/A
If queue is a member of an ending process, Then
    processServiceTime = arrival + queueServiceTime – processStart
        endingProcessJIT.processlateness = LATENESS(endingProcess,
    processServiceTime)
        endingProcessJIT.process = ending process
        endingProcessJIT.processStart = processStart
        If endingProcessJIT.processstateness > JIT.processlateness, Then
            JIT = endingProcessJIT
        EndIf
```

-continued

```
        If there are no processes starting at this queue or we're not at the
    root of the recursion, Then
            return JIT
        EndIf
    EndIf
    Foreach child queue considering the workflow
        childArrival = queueArrival + queueServiceTime + child.lag
        childJIT = JIT(child, childArrival, processStart)
        If childJIT.processlateness > JIT.processlateness, Then
            JIT = childJIT
        EndIf
    EndForeach
    return JIT
End
```

Next, the allocation plan 36 will be described in greater detail. From the above description, the allocation plan 36 is used by the router 26, JIT Module 50, and the simulator 28. The allocation plan 36 can also be manipulated by one or more manger 32 in order to adjust the urgency of particular tasks, alter schedules, change assignments, or change queue priorities. An allocation plan is defined as the percentage of all available employees (that are skilled for a particular queue) that may be used (allocated) to handle work for this queue. In an embodiment, the allocation plan 36 can be defined for each queue on an hourly basis, while in other embodiments, other time frames may be used (e.g. 15 min).

Figure 3:
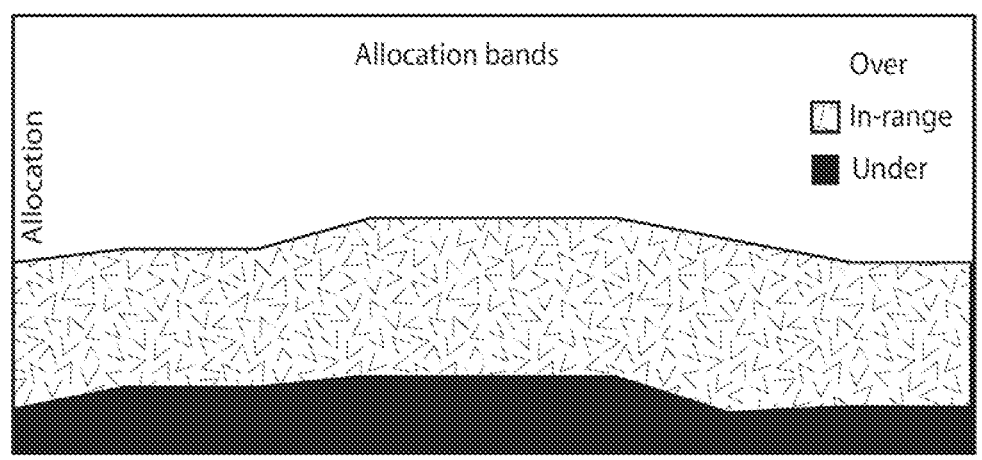
FIG. 3 depicts an exemplary graphical representation of an embodiment of an allocation plan.

FIG. 3 depicts an exemplary graphical representation of an embodiment of an allocation plan. An allocation plan is a method to prioritize work into tiers (or bands) rather than rely on a rigid set of queue or interval allocations. In a dynamic back-office workflow environment it is inherently impracticable to forecast a rigid set of allocations. In an embodiment, the allocation plan supports three bands—under allocated, in-range, and over allocated. Work is placed in a particular allocation band if that work item's queues' allocation percentage is within the band for that queue. Within an allocation band other prioritization methods are applied including the use of the JIT score as described above.

The allocation plan may be manually created by a user, automatically created by a Schedule Optimizer, Long Term Planner, by some combination of the three, or by some other process.

The allocation plan is generally used to facilitate manger control of the determinations made by the router and the simulator. The allocation plan specifies constraints upon how much work should ideally be performed against each queue for a specified time interval (e.g. 15 min. or 1 hour). These constraints may be represented by a lower bound and an upper bound.

The allocation plan 36 can be edited directly by providing values for the in-range lower and upper bounds per queue per interval, or indirectly by providing values or constraints for a related property such as backlog and/or idleness and having the system automatically determine allocation bands based upon those values.

Within the scheduling subsystem 16, the allocation plan 26 may be rebalanced in a variety of ways. Two exemplary rebalancing techniques include adjusting lower bound of the in-range band and adjusting the upper bound of the in-range band.

In an embodiment wherein the allocation plan is rebalanced by adjusting the lower bound of the in range band, first an occupancy (e.g. 1-% idleness) is calculated by summing up all the idleness of the employees who are skilled and scheduled to work a queue during some interval and distributing the idleness across the queues that they are skilled in and scheduled to work. Occupancy=1−(idleness/TotalSkilledScheduledTimeForThatInterval). Then, a queue interval is selected by determining if occupancy is less than X % from the median occupancy across all queues. If it is, then the queue or intervals with the lowest occupancy (e.g. most idle) are selected. To reduce idleness, the flow of work to the selected queue or interval is increased. Considering that work on the queue is fed by work being handled on upstream queues in the workflow, the in-range lower bound on these upstream queues for some selected intervals may need to be increased. To accomplish this through the workflow (considering the workflow rules—AHT, lag, etc.), queues or intervals with a backlog are identified. If the selected queues or intervals are not more than Z % from their allocation in-range upper bound (to deal with elements of randomness, it is preferred to not define the in-range band to be too narrow), then the lower bound is increased by Y %. Next, either an incremental, coarse, or full simulation, as described in further detail herein, is preferred as performance and accuracy dictate. If the overall service score did not get worse then the adjustments of the workflow are maintained. In an embodiment, these steps are repeated until there are no more queue or intervals that require rebalancing or we reached the maximum allowed number of iterations In an embodiment wherein the allocation plan is rebalanced by adjusting the upper bound of the in-range band, first a queue interval is selected by determining if a % backlog (wherein a % backlog=backlog/TotalBacklog) is more than a predetermined percentage from a median % backlog across all queues. If it is, then the queue(s) or interval(s) with the highest % backlog are selected. Next, a source queue (considering the workflow rules) and a time range that are feeding this backlog are determined. In this embodiment, because we want to minimize incomplete processes and workflows, the flow of new workflow into the system is slowed or reduced at the source queue. Next, if the selected queue intervals are not more than a predetermined percentage from a respective allocation in-range lower bound, then the in-range upper bound for the previously determined queue(s) or time internal(s) are reduced by a predetermined amount. Then, an incremental, coarse, or full simulation is performed. Whether an incremental, coarse, or full simulation is performed is determined as performance and accuracy dictates. If the overall service score did not get worse after the adjustments to the allocation plan, then the adjustments are maintained. In embodiments, the overall service score considers service level, backlog, and idleness. These actions are repeated until there are no more queue(s) or interval(s) that require rebalancing or a maximum allowed number of iterations is reached.

In an embodiment, the rebalancing algorithm is embedded into other scheduling modules including a schedule optimizer or a long term planner in order to provide intelligent routing and a long-term view. At selected points in the algorithm, once it has been determined that backlog and idleness cannot be eliminated through manipulations of the schedule, the rebalancing algorithm may be triggered. After this, schedules can be re-optimized versus adjusting the allocation plan. This process of rebalancing allocations and re-optimizing schedules may be repeated until convergence is reached.

As described above, simulator 28 of the routing subsystem 14 performs workflow simulations at various intervals. These simulations can either be coarse, incremental, or full simulations. Full discrete event simulations have a very high computational cost. Optimizing a schedule where hundreds of thousands of decisions are evaluated from the result of a computationally costly discrete event simulation (for each evaluation), can take longer and at a higher computation cost than desired. Solutions exist to approximate the simulation when the queues have relatively short (less than 15 mins) service goal times and short Average Handle Times (AHTs), e.g. phone queues which have relatively small cross interval dependencies. For deferred queues (e.g. email, fax, and back-office) where work is never abandoned and service goal times can be in days instead of minutes, other solutions exist to approximate simulations. These solutions work fairly well to approximate essentially a FIFO simulation. However, these solutions were found to be a poor approximation for intelligent routing, which is the simulation model required in the WAM system. Therefore, to optimize schedules that would be used with the WAM system, another method to approximate simulation was required.

Two methods as described herein, coarse simulation and incremental simulation, can address simulation needs under certain circumstances without resorting to the time and computationally intensive full discrete event simulations. Coarse simulation simulates across the entire scheduling period. Incremental simulation is a method to incrementally update an existing coarse simulation result when small modifications are tested during search.

Coarse simulation aggregates volume times AHT into workload buckets (e.g. per 15 minute interval) and handles this workload with buckets of employee availability (e.g. also per 15 minute interval). In an embodiment, volume equals in coming backlog plus new work arrivals in the interval. Push-forward simulation, which is described in greater detail in U.S. Pat. No. 6,952,732, entitled "Method and Apparatus for Multi-Contact Scheduling," which is hereby incorporated by reference in its entirety, starts at the first queue and first interval and looks forward for agent availability until all the work for that interval is handled. After this, the process is repeated for the next intervals until all work has been handled or all availability exhausted. Push-forward simulation results in a good approximation of FIFO routing.

The intelligent routing required in the WAM system introduces a couple of difficulties that make prior simulative solutions undesirable. First, the use of process goals implies that the process start information is required for all work. This means a separate work bucket per process start is needed (so that a process service time can be computed). Second, intelligent routing prioritizes all work in the backlog during each routing decision. These properties must be modeled efficiently. Therefore, a combination of both coarse and incremental simulation techniques (in addition to full discrete event simulation) are used in embodiments to optimize schedules. It is to be noted that in some embodiments, schedule modifications can be evaluated with incremental simulations alone.

An exemplary process for coarse simulation will be described in greater detail herein. In the description found herein the following terms will be used. CurrentWorkloadInterval(queue) is the earliest interval for a queue that has unhandled work. Once the JIT for a queue is computed, it is valid until the currentWorkloadInterval is advanced. ImpliedProcessWorkloadOf(workload) is the amount of process workload that has been completed for a given amount of workload getting completed on the process end queue. This enables the efficient computation of process service statistics. Active queues are queues that have unhandled work which arrived before current interval and still have unused employee availability in the current interval. As work is handled or staffing allocated, a queue is automatically deactivated if one of the above conditions no longer hold. As work is handled, staffing allocated, and the current interval advanced (during the simulation), queues oscillate between the active and inactive states. Inactive queues are queues that are not active. CheckinWorkload is a method that does much of the bookkeeping for service level related stats such as workload handled, workload handled out of service time, etc. CheckinWorkLoad also triggers the workflow rules that generate volume on child queues given the workflow.

CheckinWorkload(queue, queueArrival, serviceStart, workloadCheckedIn, processStart, endingProcessStart):

```
Begin
    If a process is ending at this queue, Then
        processServiceTime = serviceStart + AHT(queue) -
endingProcessStart
        If processServiceTime > ending process
serviceTimeGoal, Then
            Record that
impliedProcessWorkloadOf(workloadCheckedIn) was out of
service
        EndIf
    EndIf
    If coarse simulation, Then
        Apply the workflow rules for the
workloadCheckedIn considering when the process was completed
(if applicable), when the work arrived in the queue, and when the
process started) -- ApplyWorkflow(workloadCheckedIn,
queueArrival, processStart, serviceStart + AHT(queue))
    EndIf
    Record that the workload bucket for processStart was
handled at serviceStart. This is key for the queue activation logic
to work efficiently as once the bucket is fully handled we advance
to the next processStart bucket (if any) or the next interval
End
```

CoarseSimulation( ):

```
Begin
    current Interval is set to start of simulation period
    Clear stats
    Clear all dependent volume (i.e. generated as a results of
the workflow rules)
    Clear all employee allocations, (i.e. given that employees
could possibly work many different queues -- we make no initial
assumption as to what queues they're working)
    Until we have reached the end of simulation
        Activate all queues that became active at the
beginning of the current interval. This is where the JIT is
computed and it is valid for the activation period
        For all active queues
            bestQueue = highest priority active queue
from the point of view of Intelligent Routing (minus the manual
assignment and urgency logic which is not forecastable hence not
applicable to simulation)
            Allocate available staffing for current
interval workload bucket with earliest process start. If all available
staffing for current interval is exhausted for that queue, the queue
becomes inactive. Note: for employees who are scheduled / skilled
to handle work on multiple queues during this interval their
availability is given to the higher priority work.
                Successfully allocated staffing is equal to
amount of workload checked in.
                CheckinWorkload(bestQueue,
currentWorkloadInterval(bestQueue), current, allocated staffing
from previous step, earliest process start of current interval
workload bucket, ending process start)
                Note: we keep tract of the process start and
the ending process start, as for a given interval one process my end
while another process may begin and is key to being able to
compute process service levels correctly
        EndFor
        Advance current interval the next interval that is
about to become active for some queue.
    EndUntil
End
```

In addition to the coarse simulations as described above, under certain ordering conditions (during search) the simulation results of a coarse simulation can be updated by only recalculating for the interval where the staffing levels changed. An incremental simulation can therefore be performed by binding an incremental change to the results of a coarse simulation and backing that change out incrementally.

Herein described is an exemplary embodiment of a process for an incremental simulation. The incremental simulation binds staffing changes to a coarse simulation. Such a process may be called during schedule optimization when staffing for skilledQueues is modified at intervals by a bindingAmount routine. The skilled queues are activated which results in the JIT getting computed as described above. Then for all the active skilled queues the bindingAmount applied to the highest priority queue first. Then, if there is some staffing left over, (e.g. CheckinWorkload), we apply the left over to the next highest priority queue, and so forth. As the bindingAmount is applied, changes to the reversingPlan are recorded so that the binding can be backed out. In an embodiment, CheckinWorkload does not apply workflow rules when invoked from incremental simulation and immediately backed out after trying a schedule modification.

BindStaffingToSimulation(skilledQueues, interval, bindingAmount, reversingPlan):

```
Begin
    Activate each skilled queue (i.e. skilledQueues). This
affectively prioritizes the queues
        While there are active queues
            bestQueue = highest priority queue (i.e. Intelligent
Routing)
            processStart = earliest process start of best queues
current workload bucket.
            workloadCheckedIn = Min(amount,
unhandledWorkload of current bucket)
            reversingPlan.CheckinWorkload(bestQueue,
currentWorkloadInterval(bestQueue), interval,
workloadCheckedIn, earliest process start of current interval
workload bucket, ending process start)
            CheckinWorkload(bestQueue,
currentWorkloadInterval(bestQueue), interval,
workloadCheckedIn, earliest process start of current interval
workload bucket, ending process start)
            bindingAmount -= workloadCheckedIn;
        EndWhile
        Deactivate all skilled queues
End
ReversingPlan := Is a list of workload Check-ins that must be
reversed to back out an incremental change and a method stored a
workload Checkin and a method to do the reversing
```

ReversingPlan.CheckinWorkload(queue, workloadHandled, serviceInterval, processStart, queueArrival, endingProcessStart):

```
Begin
    Add to the reversing plan list, the queue, workloadHandled,
serviceInterval, processStart, queueArrival, and
endingProcessStart, of an incremental change.
End
```

ReversingPlan.Reverse( )

```
Begin
    Foreach incremental change in the reversing plan
        queue := the queue where incremental change
occurred
        CheckinWorkload(queue, queueArrival,
serviceInterval, -workloadCheckedIn, processStart,
endingProcessStart)
    EndForeach
End
```

Figures 4, 5:
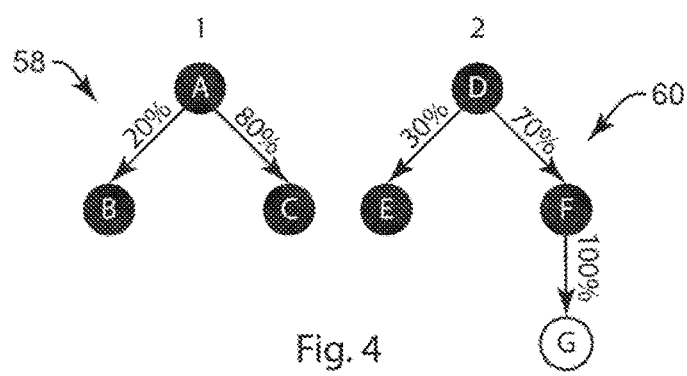
FIG. 4 diagrammatically depicts two exemplary workflows.
FIG. 5 diagrammatically depicts an exemplary schedule of available employees.

FIGS. 4 and 5 diagrammatically depict an example of a simulation. FIG. 4 diagrammatically depicts two concurrent workflows, first workflow 58 and second workflow 60. FIG. 5 diagrammatically depicts an exemplary schedule of available employees. Each of the letters A-G in FIG. 4 represents different queues in the respective workflow. Arrows connecting each letter present when work performed on one queues generates work on a subsequent queue (e.g. a work item in queue A must be completed, which generates a work item on either queue B or queue C).

This example will assume that the Predicted Queue Wait times (PQW) are all zero. The workflows 58, 60 in FIG. 4 represent five different process paths (A-B, A-C, D-E, D-F, F-G). It is to be further noted that process path D-G is a combination of process paths D-F and F-G. Each of these process paths has an exemplary process service time goal. These exemplary process service time goals may be for the purpose of example:

A-B=2 hours
A-C=6 hours
D-E=8 hours
D-F=4 hours
F-G=8 hours

Also, FIG. 5 diagrammatically depicts an exemplary employee schedule 62. The employee schedule 62 is exemplarily for four active employees but this is not intended to be limiting. The employee schedule 62 also notes the activities, denoted by the associated queue or queues (e.g. A, B, C, D, E, F, G), to which the employee is assigned to work during specified times. These assignments may be based, at least in part, upon employee skill sets, or available resources. As an example, certain activities may be able to be performed remotely, while others require an employee to be on-site. Therefore, an employee's location may dictate the activities to which an employee is assigned. Other processes may require specialized equipment (e.g. a scanner or a computer with specialized software), that limits a number of employees that may be assigned to perform the same process at the time due to the physical availability of the equipment or resources.

For the following example we will assume the following average handle times (AHT) for each the activities associated with each queue:

| Queue | AHT |
|---|---|
| A | 30 minutes |
| B | 15 minutes |
| C | 25 minutes |
| D | 30 minutes |
| E | 30 minutes |
| F | 15 minutes |
| G | 5 minutes |

The present example also assumes varied lag times between the performance of sequential processes in a workflow path. These exemplary lag times may be:

| Process Path | Lag Time |
|---|---|
| A-B | 35 minutes |
| A-C | 15 minutes |
| D-E | 5 minutes |
| D-F | 10 minutes |
| F-G | 5 minutes |

In the present example, the employee Predicted Queue Waits PQW(queue, interval) are exemplarily presented in the table of FIG. 11. Also, an exemplary Allocation Plan is presented in the table of FIG. 12. In the Allocation Plan presented in FIG. 12, an exemplary upper and lower bound for the in-range band of the Allocation Plan are presented for each queue at hourly time intervals.

For the purposes of the present example, it is assumed that five units of volume (e.g. 2 hours and 30 minutes of workload) arrive on queue A at 5:30 am and five units of volume arrive on queue D at 6:15 am. Based upon the exemplary information provided above, an available staffing is determined at the start of simulation. This available staffing is presented in the table of FIG. 13. The table of FIG. 13 can be read to exemplarily mean that at the 15 minute interval from 5:30-5:45, 45 employee minutes are available to work on activity A before any work assignments are made to the employees. Queue A is activated since there's volume for queue A at 5:30 and the JIT is computed as described above:

JIT(B, 6:20, 5:30).lateness=[(6:20+PQW(B,6:20)+AHT (B))−5:30]−ServiceGoalTime(A-B)=[(6:20+0:10+0: 15)−5:30]−2:00]=[1:15−2:00]=−0:45
JIT(B, 6:20, 5:30).process=A-B
JIT(B, 6:20, 5:30).processStart=5:30
JIT(C, 6:25, 5:30).lateness=[(6:25+PQW(C,6:25)+AHT (C))−5:30]−ServiceGoalTime(A-C)=[(6:25+0:05+0: 25)−5:30]−6:00]=[1:25−6:00]=−4:35
JIT(C, 6:25, 5:30).process=A-C
JIT(C, 6:25, 5:30).processStart=5:30
JIT(A)=LaterOf(JIT(B, 5:30+AHT(A)+LAG(A-B), 5:30), JIT(C, 5:30+AHT(A)+LAG(A-C), 5:30))=LaterOf (JIT(B, 6:20, 5:30), JIT(C, 6:25, 5:30))=<−0:45, A-B, 5:30>

Allocation(A,5:30) is currently 0% which makes queue A under allocated (i.e. less than 20%) at 5:30. However since queue A is the only queue with volume, queue A is the highest priority by default. Queue A has 2:30 of work to handle and there are :45 of resource which are all allocated to queue A. Given the schedule presented in FIG. 5, and the staffing presented in FIG. 13, allocating 0:45 staffing to activity A at 5:30 removes availability on B, C, and E. This results in remaining availabilities of B=0:00, C=0:15, and E=0:00. This also makes Allocation(A, 5:30)=100% which would make activity A over allocated (i.e. greater than 60%) as shown the Allocation Plan of the table presented in FIG. 12. Next, the 0:45 of handled workload as checked-in, which generates 0:09 workload at 6:30 on queue B and 0:36 workload at 6:15 on queue C. These are based upon the average handle time and process path lag times. Next, since all the resources available for queue A at 5:30 have been used, queue A gets deactivated.

Since there are no more active queues, the process advances to the next interval—5:45. Queue A is activated since there is 1:45 unhandled workload on queue A and there are 0:45 available staffing at 5:45. Since only one queue is still currently activated the description of the JIT computation will be skipped for this example. Queue A has 1:45 of work to handle and there are :45 of resource which are all allocated to queue A. Given the schedule, allocating 0:45 staffing to activity A at 5:45 removes availability for activities B, C, and E. Their resulting availabilities are activity B=0:00, activity C=0:15, and activity E=0:00. This also makes Allocation(A, 5:30)=100% which makes activity A over allocated (i.e. greater than 60%). As above at 5:30 the 0:45 of handled workload at activity A is checked-in, which generates 0:09 workload at 6:45 on queue B and 0:36 workload at 6:30 on queue C. Next, since all the available resources for queue A have been used at 5:45, queue A gets deactivated.

Since there are no more active queues, the process advances to the next interval—6:00. Queue A is activated since there is 1:00 unhandled workload on queue A and there are 0:45 available staffing at 6:00. Since only one queue is activated the description of the JIT computation can be skipped for this example. Queue A has 1:00 of work to handle and there are :45 of resource which are all allocated to activity A. Given the schedule, allocating 0:45 staffing of activity A at 6:00 removes availability on activities B, C, and E. Their resulting availabilities are activity B=0:00, activity C=0:15, and activity E=0:00. This also makes Allocation(A, 5:30)=100% which makes activity A over allocated (i.e. greater than 60%). The 0:45 of handled workload at activity A is checked-in, which generates 0:09 workload at 7:00 on queue B and 0:36 workload at 6:45 on queue C. Next, since all the available resources for queue A have been used at 6:00 queue A gets deactivated.

Since there are no more active queues at 6:00, the process advances to the next interval—6:15. Queue A is activated since there is 0:15 unhandled workload on queue A and there is 0:45 of available staffing at 6:15. Because at 6:15 there is also workload in queue C, and the newly arrived workload at queue D, a JIT score is calculated. The workload in queue C is the output of the work flow from queue A performed at 5:30. The JIT score is calculated by:

JIT(B, 7:05, 5:30).lateness=0:00
JIT(C, 7:10, 5:30).lateness=−3:50
JIT(A)=LaterOf (JIT(B, 7:05, 5:30), JIT(C, 7:10, 5:30))= <0:00, A-B, 5:30>

Queue C is activated since there is 0:36 unhandled workload on queue C and there are 0:45 available staffing at 6:15. JIT(C, 6:15, 5:30).lateness=[(6:15+PQW(C,6:15)+AHT(C))−5:30]−ServiceGoalTime(A-C)=[(6:15+0:05+0:25)−5:30]−6:0]=[1:15−6:0]=−4:20
JIT(C, 6:15, 5:30).process=A-C
JIT(C, 6:15, 5:30).processStart=5:30

Queue D is activated since there is 2:30 unhandled workload on queue D and there is 0:15 available staffing at 6:15.
JIT(E, 7:20, 6:15).lateness=[(7:20+PQW(E,7:20)+AHT(E))−6:15]−ServiceGoalTime(D-E)=[(7:20+0:00+0:30)−6:15]−8:00]=[1:35−8:00]=−7:65
JIT(E, 7:20, 6:15).process=D-E
JIT(E, 7:20, 6:15).processStart=6:15
JIT(F, 7:20, 6:15).lateness=[(7:20+PQW(F,7:20)+AHT(F))−6:15]−ServiceGoalTime(D-F)=[(7:20+0:15+0:15)−6:15]−4:00]=[1:35−4:00]=−3:65
JIT(F, 7:20, 6:15).process=D-F
JIT(F, 7:20, 6:15).processStart=6:15

JIT(D)=LaterOf (JIT(E, 6:15+AHT(D)+LAG(D-E), 6:15), JIT(F, 6:15+AHT(D)+LAG(D-F), 6:15))=Max (JIT(E, 7:20, 6:15), JIT(C, 7:25, 6:15))=<−3:65, D-F, 6:15>

At this point, no work has been allocated yet at 6:15, therefore allocation %=0% for activities A, C, and D. However, the lower bounds of the AllocationPlan at 6:15 are: AllocationPlan(lower)(A, 6:15)=25% and AllocationPlan(lower)(C, 6:15)=15% while AllocationPlan(lower)(D, 6:15)=0%. This means that activity D is in the "In-Range" band while activities A and C are in the "Under" band. Therefore, activity A and activity C are higher priority, even though JIT(D) is later than JIT(C). Furthermore, since JIT(A).process=A-B and JIT(C).process=A-C, they are not part of same activity and JIT(A) lateness wins.

This leaves us with the following prioritization: activity A, then activity C, then activity D. Queue A has 0:15 of work to handle and there are :45 of resource which get allocated to activity A. Given the schedule, allocating 0:15 staffing of to activity A at 6:15 removes 0:15 availability on activities C and E. Their resulting availabilities are activity C=0:30 and activity E=0:00. This also makes Allocation(A, 6:15)=33% which would put activity A in the "In-Range" allocation band. Also, activity A is deactivated since there is not more workload at 6:15. Queue C has 0:36 of work to handle and there are :30 of resource which get allocated to activity C. Given the schedule, allocating 0:30 staffing of activity C at 6:15 removes 0:30 availability on activities B, E, and F. Their resulting availabilities are activity B=0:00, activity C=0:00, activity E=0:00, and activity F=0:00. This also makes Allocation(C, 6:15)=66% which would put activity C in the "Over" allocation band. Work is 0:36 Checked-in at 6:15 which records that is was completed within service time. Queue C is deactivated since there is not more workload at 6:15. Queue D is deactivated since there are no more available resources at 6:15. Since no active queues, advance to next interval. This process is continued until the end of simulation.

Embodiments of the key WAM system provide intelligent routing to balance the competing goals that often exist in the back-office workflow. Service agreements may state that a process must be completed by a defined deadline or within some service time, employees must be kept working and backlogs cannot be allowed to grow to unreasonable levels. In addition, managers may decide that for some external reason certain work has become critically important and/or must be assigned to particular employees.

Intelligent routing handles all these competing goals, in a dynamic environment that is inherently difficult to predict. First, logic is applied to make sure manually assigned work gets to the right employee and critical work is handled first. Then, an Allocation Plan as described above is considered to make sure that backlog and idleness are kept within an acceptable range. Within the bands of the allocation plan, the JIT algorithm, as previously described, is applied to make sure process service goals are achieved.

By tying in, through the JIT and the Allocation Plan, the long term analysis of a Schedule Optimizer and/or Long Term Planner, Intelligent Routing of the WAM system has the tools to handle long term imbalances while at the same time being able to deal with dynamic real time factors.

Figure 6:
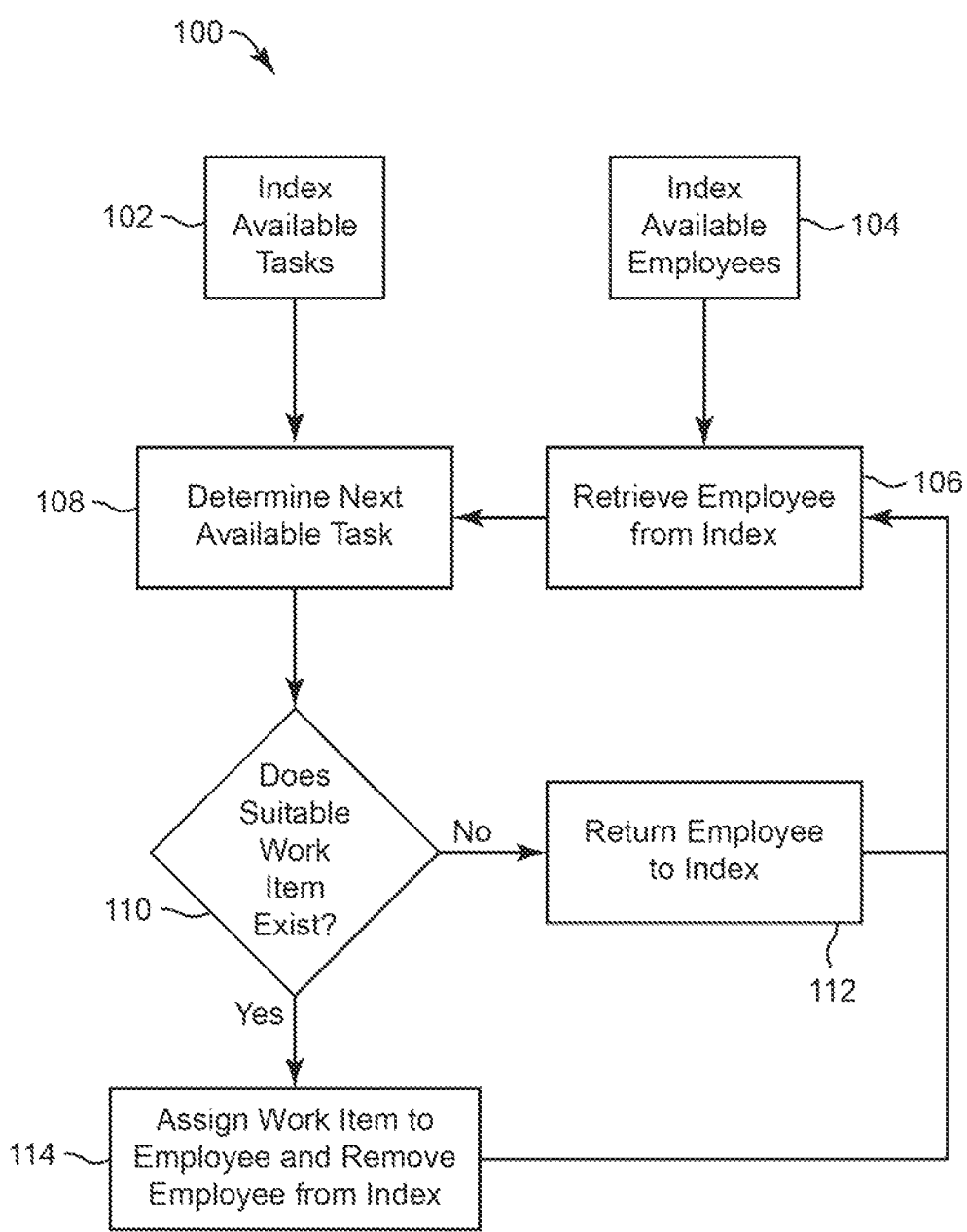
FIG. 6 is a flow chart that depicts an exemplary embodiment of a method of intelligent routing.

FIG. 6 is a flow chart that depicts and exemplary embodiment of a method of intelligent routing 100. The method 100 may be carried our with the routing subsystem 14 in the WAM 10 as described above. The method 100 begins by indexing all available tasks at 102 and indexing all available employees 104. Tasks are indexed at 102 by task queue, task urgency (indexing more urgent tasks first) and/or by work items age. A work item age may be an amount of time elapsed between when the item arrived and when the routing occurs with greater priority given to older items first. Each task is given a unique rank that reflects the task's position within the index.

The available employees are indexed at 104 primarily based upon the employee next availability, ranking those employees that are currently available or will become available the soonest highest within the index. In embodiments, employees may be secondarily indexed based upon a skill level by ranking the least skilled employees first. Skill level in such an embodiment may be measured as the number of tasks or queues to which the employee is skilled or assigned to work on. Therefore, preference is given to assigned work to employees with the least flexibility in the types of tasks to which the employees can be assigned such that a wider availability of tasks to which employees may work is maintained. In one embodiment, employee proficiencies may be taken into account which may be reflected as sum of the employee's proficiency across all tasks or queues.

Figure 7:
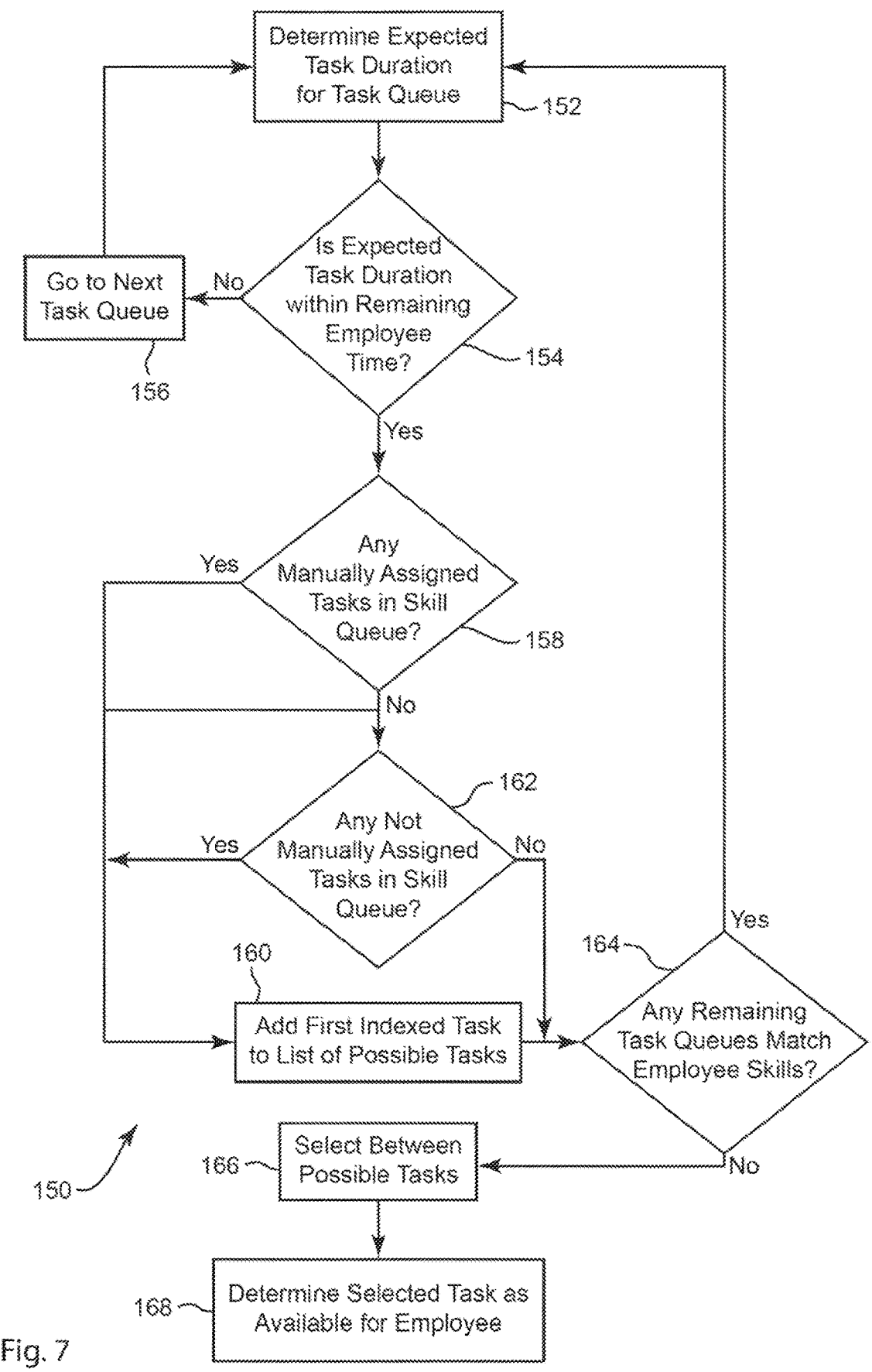
FIG. 7 is a flow chart that depicts an exemplary embodiment of a method of determining a next available task for an employee.

At 106 the first employee is retrieved from the index. At 108 a next task is determined for the selected employee. FIG. 7 depicts an exemplary embodiment of a method 150 of determining a next available task for an employee, which may be performed at 108, and which will be described in further detail herein.

At 110 a determination is made whether a suitable work item exists to be assigned to the employee. If no suitable work item exits, the process returns to 106 and the next employee from the index is retrieved for task assignment. If the employee's next availability is within a predetermined current window of interest, the employee is returned back into the index of available employees at 112.

If the suitable work item does exist, the work item is assigned to the employee at 114 and the employee is removed from the index of available employees and the process returns to 106 to retrieve the next employee from the index.

As referenced above, FIG. 7 depicts an exemplary embodiment of a method 150 of determining a next available task for an employee which may be performed as a part of embodiments of the method of intelligent routing 100 as described above.

The method 150 begins at 152 by determining an expected task duration for a task queue for each queue in the skill set of an identified employee. The expected task duration may be determined based upon a given time standard for the queue, employee proficiency, and/or task shrinkage.

At 154 a determination is made if the expected task duration is within a remaining employee time. If the task duration is not within an acceptable threshold of remaining employee time, then at 156 the process returns to 152 to determine an expected task duration for a next queue in the skill set of the designated employee.

If the expected task duration is within an acceptable threshold of remaining employee time, then the process continues to 158 where a determination is made if any tasks in the designated queue were manually assigned to the designated queue. If one exists then at 160 the first indexed, manually assigned task is added to a list of possible tasks. At 162 a determination is made if any tasks in the skill queue were not manually assigned to that skill queue and if any not manually assigned tasks are identified at 162, then at 160 the first indexed task that was not manually assigned to the skill queue is added to a list of possible tasks.

After the first indexed task of either the manually assigned task or not manually assigned task are added to the list of possible tasks at 160, or in the event that no manually assigned tasks or not manually assigned tasks were identified, then at 164 a determination is made if there are any additional task queues that match an employee skill. If there are any remaining task queues, then the process returns to 152 to determine an expected task duration for the additional task queues. Then the process is repeated until there are no remaining task queues.

If there are no remaining task queues at 164, then the process continues to 166 where a best task is selected from the list as possible tasks. In selecting between the tasks on a list of possible tasks, a variety of criteria may be used to make the selection. A task may be selected if it has a higher urgency then another task. Task urgency may be a predetermined value which in an embodiment may be set at either urgent or normal. The task may be selected if the task's queue allocation ranking is lower than the other task's queue allocation ranking for intervals containing the start time of the task. An allocation ranking may be one of the following values: below minimum allocation, between minimum allocation and maximum allocation, above maximum allocation. A task may be selected if the task is manually assigned while another task is not manually assigned. Manual assignment of a task can either be done within the WAM system by a manager, or may be performed by an external case management system.

A task may be selected if the tasks JIT score is higher than the other tasks JIT score within some threshold. A task may be selected if the tasks queue employee skill priority is greater than the other tasks queue employee skill priority.

After a task has been selected form the list of possible tasks, the selected task is determined at 168 as available for the employee.

The following is a more detailed, but non-limiting example, to provide further context as to embodiments of the intelligent routing as disclosed herein. The example exemplarily includes the following seven tasks to be routed:

| Task | Queue | Urgency | Arrival | Duration | Rank |
|------|-------|---------|---------|----------|------|
| T1 | A | Normal | 7:00 | 60 | 2 |
| T2 | A | High | 8:00 | 60 | 1 |
| T3 | B | Normal | 7:45 | 60 | 4 |
| T4 | B | Normal | 7:30 | 60 | 3 |
| T5 | A | Normal | 9:00 | 60 | 5 |
| T6 | C | Normal | 9:00 | 60 | 6 |
| T7 | C | Normal | 10:00 | 60 | 7 |

If the example exemplarily starts at 8:00, the tasks are actual tasks that exist as backlog at the time of the route (8:00 am). Task T5 is a forecasted arrival at queue A at 9:00. T6, T7 are simulated arrivals at queue C at 9:00 and 10:00, respectively, C that are generated during the routing process based upon the workflow configuration.

The following employees are exemplarily available:

| Employee | Skills | Start Time |
|----------|--------|------------|
| E1 | A, B, C | 8:00 |
| E2 | B, C | 8:00 |

The following are exemplary allocation bands as represented in employee minutes per hour:

| Allocation Bands (denominated in employee minutes): | | | |
|---|---|---|---|
| Time | Queue: A | Queue: B | Queue: C |
| 8:00 | Min: 60, Max: 60 | Min: 60, Max: 60 | Max: 0 |
| 9:00 | Min: 60, Max: 60 | Min: 60, Max: 60 | Max: 0 |
| 10:00 | Min: 60, Max: 60 | Max: 0 | Min: 60, Max: 60 |
| 11:00 | Max: 0 | Min: 60, Max: 60 | Min: 60, max: 60 |

Queues B and C make up a work flow which means that when a task is completed at queue B the task moves on to queue C.

The following is an exemplary embodiment of a routing process as may be carried out within embodiments as disclosed herein:

1. Index all actual backlog work items (t1-t4) and generate forecasted work items at their expected time (t5)
2. Employee e2 is selected for scheduling at 8:00 (e2's next availability)
    Employees are ordered by next availability first, and skill second (low to high)—so the employee index is: e2, e1. Employee e2 is the first in the index.
3. Task t4 is selected
    Tasks are indexed by priority first (high to low) and age second (high to low)—so task index is: t2, t1, t4, t3, t5. The lowest ranking tasks of the queues employee e2 is skilled to work at (B, C) are [t4]. Task t4 is select as the best of those.
4. Task t4 is assigned to employee e2. Employee e2's next availability is advanced until the expected end of task t4 (9:00)
5. Task t6 is generated at 9:00 based upon the work flow configuration and the expected completion of task t4 at 9:00. Base upon its arrival time, it is given a rank of 6 in the task index.
6. Indexes are updated
    The employee index is now: e1, e2 because employee index is ordered primarily by first available time and e2's first available time is now 9:00. The task index is now: t2, t1, t3, t5, t6
7. Employee e1 is selected for scheduling at 8:00 (e1's next availability)
    Employee e1 is the first employee in the employee index
8. Task t2 is selected
    The lowest ranking tasks of the queues employee e1 is skilled to work at (A, B, C) are: [t2, t3]. Task t3 has a lower queue allocation ranking and is selected as the best.
9. Task t2 is assigned to employee e1. Employee e1's next availability is advanced until the expected end of task t2 (9:00)
10. Indexes are updated
    The employee index is now: e2, e1. The task index is now: t1, t3, t5, t6
11. Employee e2 is selected for scheduling at 9:00 (e2's next availability)
    Employee e2 is the first employee in the employee index
12. Task t3 is selected
    The lowest ranking tasks of the queues employee e2 is skilled to work at (B, C) are [t3, t6]. Task t3 is select as the best of those because it has a lower queue allocation ranking.
13. Task t3 is assigned to employee e2. Employee e2's next availability is advanced until the expected end of task t3 (10:00)
14. Task t7 is generated at 10:00 based upon the work flow configuration and the expected completion of task t3 at 10:00. Base upon its arrival time, it is given a rank of 7 in the task index.
15. Indexes are updated
    The employee index is now: e1, e2. The task index is now: t1, t5, t6, t7
16. Employee e1 is selected for scheduling at 9:00 (e1's next availability)
    Employee e1 is the first employee in the employee index
17. Task t1 is selected
    The lowest ranking tasks of the queues employee e1 is skilled to work at (A, B, C) are: [t1, t5, t6]. Task t1 has a lower queue allocation ranking and is selected as the best.
18. Task t1 is assigned to employee e1. Employee e1's next availability is advanced until the expected end of task t1 (10:00)
19. Indexes are updated
    The employee index is now: e2, e1. The task index is now: t5, t6, t7
20. Employee e2 is selected for scheduling at 10:00 (e2's next availability)
    Employee e2 is the first employee in the employee index
21. Task t6 is selected
    The lowest ranking tasks of the queues employee e2 is skilled to work at (B, C) are [t6].
    Task t6 is select as the best of those.
22. Task t6 is assigned to employee e2. Employee e2's next availability is advanced until the expected end of task t6 (11:00)
23. Indexes are updated
    The employee index is now: e1, e2. The task index is now: t5, t7
24. Employee e1 is selected for scheduling at 10:00 (e1's next availability)
    Employee e1 is the first employee in the employee index
25. Task t5 is selected
    The lowest ranking tasks of the queues employee e1 is skilled to work at (A,B, C) are [t5, t7]. Task t5 is select as the best of those because it has a lower queue allocation ranking.
26. Task t5 is assigned to employee e1. Employee e1's next availability is advanced until the expected end of task t5 (11:00)
27. Indexes are updated
    The employee index is now: e2, e1. The task index is now: t7
28. Employee e2 is selected for scheduling at 11:00 (e2's next availability)
    Employee e2 is the first employee in the employee index
29. Task t7 is selected
    The lowest ranking tasks of the queues employee e2 is skilled to work at (B, C) are [t7].
    Task t7 is select as the best.
30. Task t7 is assigned to employee e2. Employee e2's next availability is advanced until the expected end of task t5 (12:00)
31. Indexes are updated
    The employee index is now: e1, e2. The task index is now: empty In some embodiments, one or more processes may have started but not finished at the end of a simulation period (whether in the router or the scheduler). In an embodiment, estimates of process completions for those processes are generated using ET (Estimated completion time) algorithm. The estimated queue wait times, used to calculate ET, may be supplied from the optimizing scheduler, by user input, by prior simulation runs, or by some other mechanism.

The expected completion time may be computed for any work items in a queue that is part of a process. If the current queue is the end of the process, the estimated completion time of the process is returned as the completion time of the work item at that queue. If the current queue is not the end of a process (e.g. it has one or more child queues), the completion time for each child is computed and the greatest of those is returned as the completion time for the process. The arrival time into a child queue is computed as the completion time of the item in the current queue plus any lag time between that queue and the child and the average wait time for that queue at that time.

Figure 2:
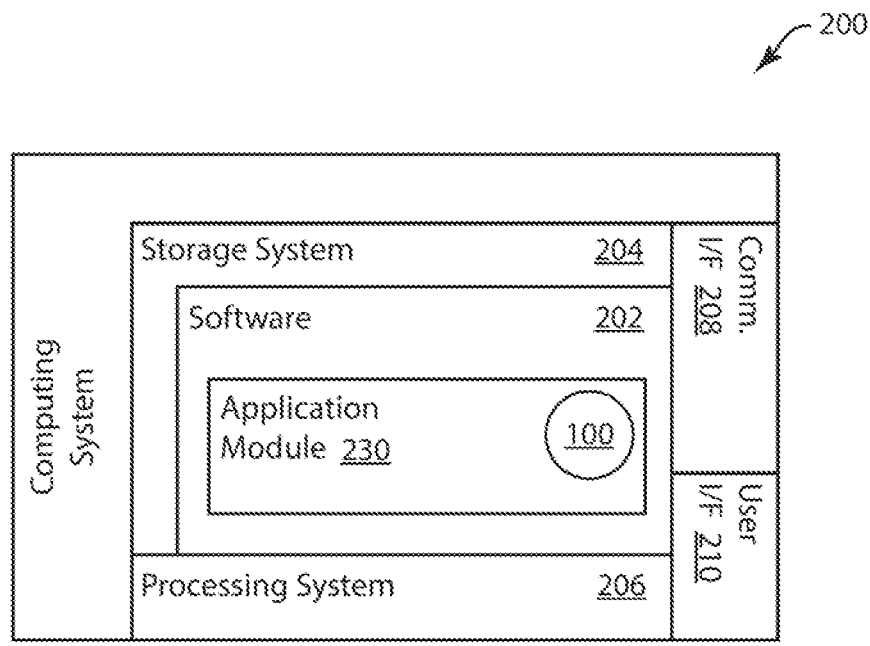
FIG. 2 depicts an exemplary embodiment of a system for work assignment management.

FIG. 2 is a system diagram of an exemplary embodiment of a computing system 200 for workforce allocation management WAM. Embodiments of the computing system 200 may carry out all or some of the functions and processes as described above with respect to FIG. 1. In still further embodiments, more than one computing system 200 may be used to implement the disclosed workforce allocation management system. The computing system 200 is generally a computing system that includes a processing system 206, storage system 204, software 202, communication interface 208 and a user interface 210. The processing system 206 loads and executes software 202 from the storage system 204, including a software module 230. When executed by the computing system 200, software module 230 directs the processing system 206 to operate as described herein in further detail in accordance with the method 100, and other processes as described herein in detail.

Although the computing system 200 as depicted in FIG. 2 includes one software module in the present example, it should be understood that one or more modules could provide the same operation. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 can include a microprocessor and other circuitry that retrieves and executes software 202 from storage system 204. Processing system 206 can be implemented within a single processing device but can also be distributed across multiple processing devices or subsystems that cooperate in executing program instructions. Examples of processing system 206 include general purpose central processing units, application specific processors, and logic devices, as well as any other type of processing devices, combinations of processing devices, or variations thereof.

The storage system 204 can include any storage media readable by processing system 206, and capable of storing software 202. The storage system 204 can include volatile and non-volatile, removable and non-removable media implemented in any method or technology for storage of information, such as computer readable instructions, data structures, program modules, or other data. Storage system 204 can be implemented as a single storage device but may also be implemented across multiple storage devices or sub-systems. Storage system 204 can further include additional elements, such a controller capable of communicating with the processing system 206.

Examples of storage media include random access memory, read only memory, magnetic discs, optical discs, flash memory, virtual and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media.

User interface 210 can include a mouse, a keyboard, a voice input device, a touch input device for receiving a gesture from a user, a motion input device for detecting non-touch gestures and other motions by a user, and other comparable input devices and associated processing elements capable of receiving user input from a user. In embodiments, the user interface 210 operates to present and/or to receive information to/from a user of the computing system. Output devices such as a video display or graphical display can display an interface further associated with embodiments of the system and method as disclosed herein. Speakers, printers, haptic devices and other types of output devices may also be included in the user interface 210. In an exemplary embodiment, the user interface 210 may operate to receive a user input or selection in accordance with the execution of embodiments of the method 100 or other methods or processes as disclosed herein. In one embodiment, a manager input of an adjustment to an allocation band, or a task priority is received.

As described in further detail herein, the computing system 200 receives and transmits data through the communication interface 208. In embodiments, the communication interface 208 operates to send and/or receive data to/from other devices to which the computing system 200 is communicatively connected. In the computing system 200, newly received tasks or workload may be received, or an identification thereof received. Further more, employee schedules, skills, or average task completion time may be received. The computing system operates to carry out the method as described herein to carry out intelligent routing of incoming workflow and to simulate and allocate workflow among available employees.

Figure 8:
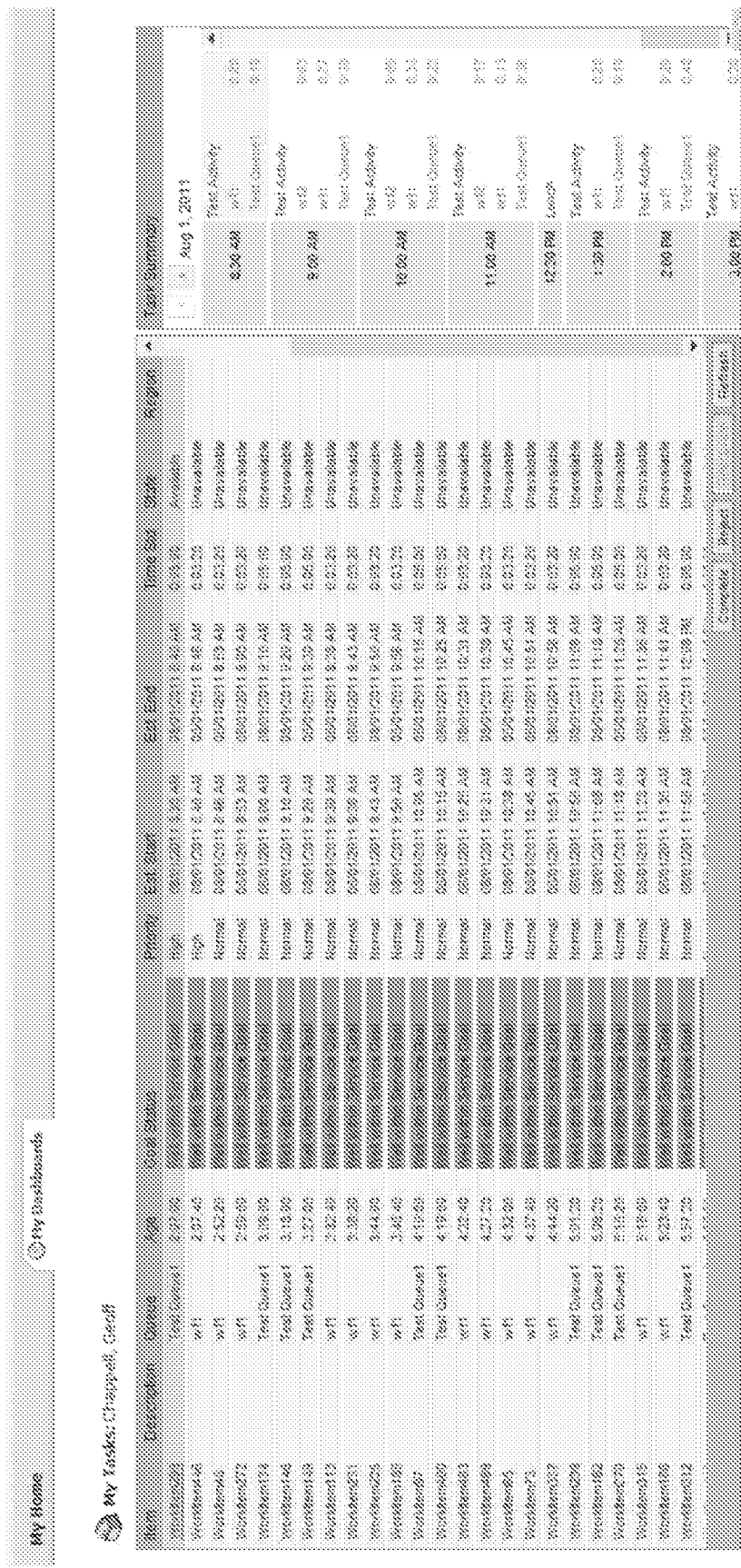
FIG. 8 is an exemplary embodiment of a screen shot of a hyperlinked task list.

As previously described above, the router 26 provides the workflow routing by providing a task list of hyperlinks to the assigned employee. The task list of hyperlinks will open requisite files or programs at the employee user interface 30 upon selection of a hyperlink. FIG. 8 is an exemplary screen shot of a hyperlinked task list. This help to coordinate the intelligent routing of the WAM system with external systems so as to achieve overall performance objectives.

The router 26 produces ordered lists of tasks for each employee. The application displays the task list to each employee. Each task can include a link to the application where that task can be performed. In an exemplary embodiment, though more items may be displayed, only the top N can be selected for work by the employee. The value N is configurable and is typically just one. When the value is greater than 1, it may be measured in number of work items (e.g. ten), or in a time span (e.g. all tasks in for the next hour). An item that is available for work includes a hyperlink that when clicked opens up the appropriate application to perform the work.

In an embodiment, the user can interact with the task list to specify multiple actions on a work item. The user may specify the task as complete. The user may specify the task as rejected and enter a reason for the rejection. The user may specify the task as reactivate which reopens a task for work by the user in the event that the user "completed" or "rejected" the task in error.

The intelligent router computes the forecasted service level of each work item in the current backlog as it assigns work to employees who are skilled and available to do that work. The intelligent router relies on the JIT score and an allocation plan computed by the schedule optimizer through coarse or incremental simulation. The routing process begins with whatever backlog exists at each queue. In order to make accurate predictions, the router must simulate arrivals of new work items throughout the routing period. These new arrivals are either based upon forecasted arrival patterns, or when workflows exist, based on the predicted completion of a prior step in a workflow.

Figure 9:
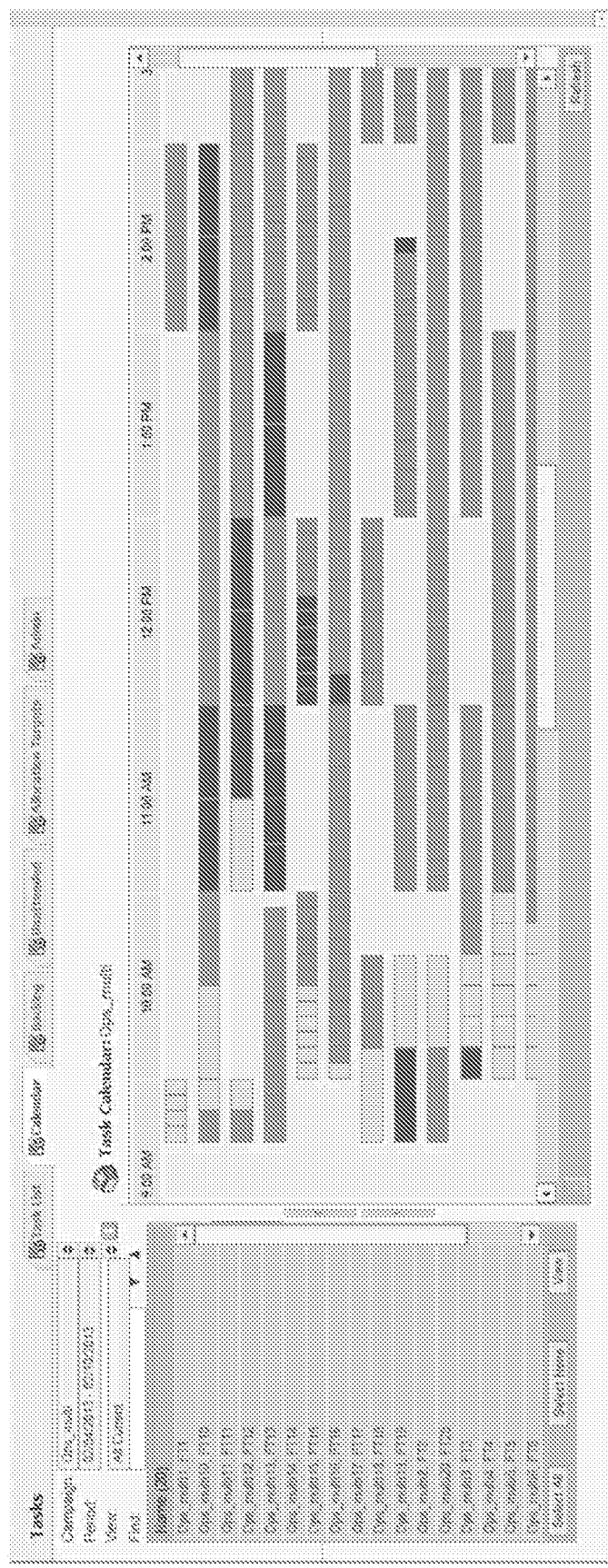
FIG. 9 is an exemplary embodiment of a screen shot of a service level heat map.

FIG. 9 is an exemplary embodiment of a service level heatmap which is a visualization of service level for an entire backlog, actual and forecasted. The service level heatmap is meant to provide actionable information to managers in the Back Office for intraday or weekly planning purposes. Three categories of service level status are highlighted in the heatmap—red or out of service goal, green or within service goal and yellow or at risk. Within a matrix layout of employees versus time of day, each work item (actual or forecasted) is shown color-coded based on its predicted service level at time of completion. Furthermore, the manager can click on an individual work item to see the details and step-by-step predictions of the entire workflow process as simulated by the intelligent router. This allows the manager to not only know the forecasted service level of the work item at the current step in the process but also know the forecasted service level at each step in the process. This empowers the manager to be proactive in managing backlog and meet performance goals.

For example if the heatmap shows green for a work item in the current step in the morning half and red for the same item at a later step of the process in the afternoon, the manager can evaluate the anticipated bottleneck in the afternoon and take one of many actions to circumvent it—increase staffing level with the required skill for the afternoon step in the process, escalate the urgency of the work item so the router gives priority to that item as it assigns to employees at different steps in the process or the manager can simply manually assign the work item to an employee he or she knows has the skillset and bandwidth to work on it within the service goal time.

Figure 10:
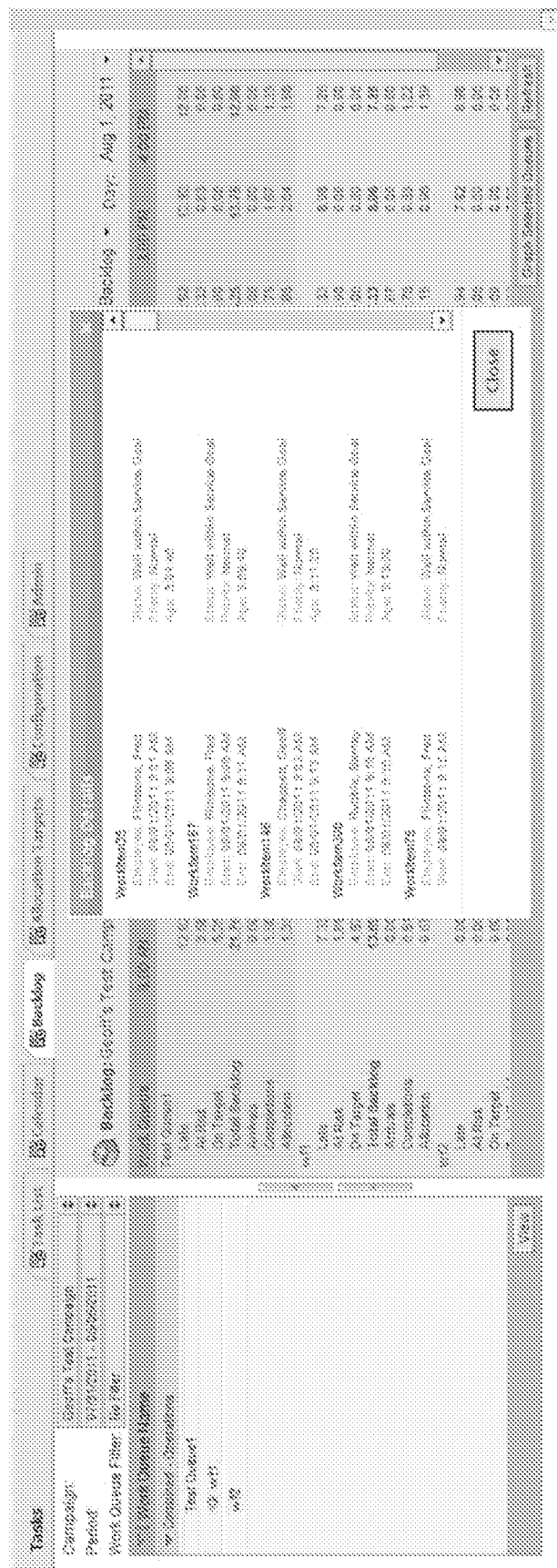
FIG. 10 is an exemplary embodiment of a screen shot of a queue backlog page.

FIG. 10 is an exemplary embodiment of screen shot of a queue backlog page. The queue backlog page displays actual and forecasted values of backlog for each work queue over time. Backlog is shown broken into several categories corresponding to those used in the heatmap (out of service goal, at risk, and within service goal) as well as shown in total. Additional statistics such as forecasted arrivals and completions are also shown for each queue interval. The manager can click on any of these values to see the detail behind them—e.g. the actual work items in backlog at the current time, or the predicted items in backlog at a future time.

A manager can use these predictions of backlog and service levels to take actions such as rescheduling of employees or reallocation of work in order to better achieve the organization's goals.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of automated intelligent routing of work assignments, the method comprising:
   indexing a plurality of pending tasks in an electronically stored pending task list;
   electronically simulating a schedule of work item assignments for a discrete time interval based upon (i) a plurality of possible workflows for processing work items for each pending task in the electronically stored pending task list and (ii) an electronically stored schedule of available employees, each employee identified in the electronically stored schedule possessing at least one skill from a plurality of skills, each skill in the plurality of skills associated with a type of work item, and a plurality of work items, wherein the electronically simulating the schedule of work item assignments comprises, electronically:
      determining each type of work item for which there are pending work items,
      calculating a comparative lateness of each of the pending work items,
      determining a highest priority type of work item from the calculated comparative lateness of each of the pending work items, and
      allocating each employee with the skill associated with the type of work item according to the at least one skill possessed by each employee, the type of work item determined to be the highest priority to the pending work items of the highest priority type of work items, wherein if a number of available employees is greater than a number of work items, all work items are allocated, and if the number of work items is greater than the number of available employees, any remaining unassigned work items are queued for a next sequential discrete time interval;
   automatically indexing a plurality of available employees based upon the simulation;
   automatically retrieving a first employee from the index of available employees;
   automatically determining a next available task assignable to the first employee;

automatically assigning a work item from the next available task to the first employee from the index of available employees;
automatically removing the assigned work item from the electronically stored pending task list; automatically removing the first employee from the index of available employees;
automatically retrieving a next employee from the index of available employees repeating the assigning, removing, and removing steps until there are no pending tasks in the electronically stored pending task list that are assignable to any employee remaining in the index of available employees; and
automatically displaying, via a graphical user interface, a service level heat map, wherein the service level heat map comprises the assigned work items arranged in a matrix of employees versus time of day, the assigned work items color coded based on a service goal, and wherein the arrangement of the color coding identifies an anticipated bottleneck.

2. The method of claim 1, further comprising determining if the work item in the next available task exists.

3. The method of claim 1, wherein the plurality of pending tasks in the electronically stored pending task list are indexed based upon a lateness of work items in a work item queue for each of the pending tasks.

4. The method of claim 3, further comprising:
electronically simulating a workflow based upon known employee schedules, known work items in the work item queue, workflow processes, and predicted new work items;
electronically calculating an average queue wait time and an average handling time from the simulation for each known work item, each workflow process, and each predicted new work item;
electronically calculating a predicted service time from the average queue wait time and the average handling time for each known work item, each workflow process, and each predicted new work item; and
electronically calculating a predicted lateness as a difference between a predetermined service time goal and the predicted service time for each known work item, each workflow process, and each predicted new work item.

5. The method of claim 4, further comprising:
presenting the predicted lateness for each of the work items in the work item queue in a table via the graphical user interface that identifies each of the work items and the predicted lateness for each work item;
wherein the predicted lateness is presented categorically based upon the predicted lateness for the work item and the predetermined service time goal for the work item.

6. The method of claim 1, wherein the plurality of available employees are indexed in the index of available employees based upon at least one employee skill.

7. The method of claim 1, further comprising estimating a process completion time for a work item of the work items by:
electronically simulating a workflow based upon known employee schedules, known work items in a work item queue, workflow processes, and predicted new work items;
electronically calculating an average lag time between each process in the workflow and an average handling time for each process in the workflow from the simulation; and
electronically summing a remaining at least one average lag time and at least one average handling time for each process remaining for the work item in the workflow.

8. The method of claim 1, further comprising providing at least one hyperlink to the first employee, the hyperlink associated to a location on a network with data associated with the assigned work item.

9. A system for automated intelligent routing of work assignments, the system comprising:
a display for a graphical user interface that displays a service level heat map;
a processor; and
a non-transitory computer readable medium programmed with computer readable code that upon execution by the processor causes the processor to:
index a plurality of pending tasks in an electronically stored pending task list;
electronically simulate a schedule of work item assignments for a discrete time interval based upon (i) a plurality of possible workflows for processing work items for each pending task in the electronically stored pending task list and (ii) an electronically stored schedule of available employees, each employee identified in the electronically stored schedule possessing at least one skill from a plurality of skills, each skill in the plurality of skills associated with a type of work item, and a plurality of work items, wherein the electronically simulating the schedule of work item assignments includes causing the processor to, electronically:
determine each type of work item for which there are pending work items,
calculate a comparative lateness of each of the pending work items,
determine a highest priority type of work item from the calculated comparative lateness of each of the pending work items, and
allocate each employee with the skill associated with the type of work item according to the at least one skill possessed by each employee, the type of work item determined to be the highest priority to the pending work items of the highest priority type of work items, wherein if a number of available employees is greater than a number of work items, all work items are allocated, and if the number of work items is greater than the number of available employees, any remaining unassigned work items are queued for a next sequential discrete time interval;
automatically index a plurality of available employees based upon the simulation;
automatically retrieve a first employee from the index of available employees;
automatically determine a next available task assignable to the first employee;
automatically assign a work item from the next available task to the first employee from the index of available employees;
automatically remove the assigned work item from the electronically stored pending task list;
automatically remove the first employee from the index of available employees;
automatically retrieve a next employee from the index of available employees repeating the assigning, removing, and removing steps until there are no pending tasks in the electronically stored pending task list that are assignable to any employee remaining in the index of available employees; and automatically display, via the graphical user interface, a service level heat map, wherein the service level heat map comprises the assigned work items arranged in a matrix of employees versus time of day, the assigned work items color coded based on a service goal, and wherein the arrangement of the color coding identifies an anticipated bottleneck.

10. The system of claim 9, wherein the processor is further instructed to determine if the work item in the next available task exists.

11. The system of claim 9, wherein the plurality of available employees are indexed in the index of available employees based upon at least one employee skill.

12. The system of claim 11, wherein the available employees on the index of available employees are indexed with employees with a least number of employee skills indexed first.

13. The system of claim 11, wherein the processor is further instructed to:
divide a schedule of the plurality of employees into discrete time intervals, the plurality of employees each possessing the at least one of the plurality of skills, each of the plurality of skills being associated with a specific work task; and
determine an allocation for each of the plurality of skills as the percentage of available employees possessing a skill associated with the specific work task associated with the skill.

14. The system of claim 13, wherein the work items are assigned among the plurality of employees, wherein a single work item is assigned to an employee per discrete time interval and the work items are assigned to employees based upon the allocation.

15. The system of claim 13, wherein the processor is further instructed to receive an allocation plan with at least a minimum allocation percentage goal and maximum allocation percentage goal for each skill, and the determination of the allocation for each of the plurality of skills is at least partly based upon the allocation plan.

16. A non-transitory computer-readable medium having instructions stored thereon for automated intelligent routing of work assignments, wherein the instructions, when executed by a processing system, direct the processing system to:
index a plurality of pending tasks in an electronically stored pending task list;
electronically simulate a schedule of work item assignments for a discrete time interval based upon (i) a plurality of possible workflows for processing work items for each pending task in the electronically stored pending task list and (ii) an electronically stored schedule of available employees, each employee identified in the electronically stored schedule possessing at least one skill from a plurality of skills, each skill in the plurality of skills associated with a type of work item, and a plurality of work items, wherein the electronically simulating the schedule of work item assignments includes causing the processor to, electronically:
determine each type of work item for which there are pending work items,
calculate a comparative lateness of each of the pending work items,
determine a highest priority type of work item from the calculated comparative lateness of each of the pending work items, and
allocate each employee with the skill associated with the type of work item according to the at least one skill possessed by each employee, the type of work item determined to be the highest priority to the pending work items of the highest priority type of work items, wherein if a number of available employees is greater than a number of work items, all work items are allocated, and if the number of work items is greater than the number of available employees, any remaining unassigned work items are queued for a next sequential discrete time interval;
automatically index a plurality of available employees based upon the simulation;
automatically retrieve a first employee from the index of available employees;
automatically determine a next available task assignable to the first employee;
automatically assign a work item from the next available task to the first employee from the index of available employees;
automatically remove the assigned work item from the electronically stored pending task list;
automatically remove the first employee from the index of available employees;
automatically retrieve a next employee from the index of available employees repeating the assigning, removing, and removing steps until there are no pending tasks in the electronically stored pending task list that are assignable to any employee remaining in the index of available employees; and
automatically display, via a graphical user interface, a service level heat map, wherein the service level heat map comprises the assigned work items arranged in a matrix of employees versus time of day, the assigned work items color coded based on a service goal, and wherein the arrangement of the color coding identifies an anticipated bottleneck.

17. The non-transitory computer-readable medium of claim 16, further directing the processing system to determine if the work item in the next available task exists.

18. The non-transitory computer-readable medium of claim 16, wherein calculating the comparative lateness of each pending work item further directs the processing system to:
electronically simulate a workflow based upon known employee schedules, known work items in a work item queue, workflow processes, and predicted new work items;
electronically calculate an average queue wait time and an average handling time from the simulation;
electronically calculate a predicted service time from the average queue wait time and the average handling time; and
electronically calculate a predicted lateness as a difference between a predetermined service time goal and the predicted service time.

19. The non-transitory computer-readable medium of claim 18, further directing the processing system to:
electronically calculate a just-in-time (JIT) score representative of an elapsed time for a work item compared to a desired service time for that work item;
wherein if the work item is not within any process, the JIT score is the comparative lateness of the work item;
wherein if the work item is at an end of any process, the JIT score is an overall lateness of the process; and
wherein if the work item is within any process, the JIT score is a maximum lateness of any queue within the process.

20. The non-transitory computer-readable medium of claim 16, further directing the processing system to provide at least one hyperlink to the first employee, the hyperlink associated to a location on a network with data associated with the assigned work item.

\* \* \* \* \*